(12) United States Patent
Vierzba et al.

(10) Patent No.: US 8,327,329 B2
(45) Date of Patent: Dec. 4, 2012

(54) APPLICATION DEHYDRATION, SYNCHRONIZATION, AND REHYDRATION

(75) Inventors: David M. Vierzba, Seattle, WA (US); Andrew R. Miller, Issaquah, WA (US); Sumit Chauhan, Sammamish, WA (US); Timothy E. Getsch, Bellevue, WA (US); Scott T. Gardner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1022 days.

(21) Appl. No.: 12/134,732

(22) Filed: Jun. 6, 2008

(65) Prior Publication Data

US 2009/0307661 A1   Dec. 10, 2009

(51) Int. Cl.
*G06F 9/44* (2006.01)
(52) U.S. Cl. ........................................................ 717/120
(58) Field of Classification Search .................. None
See application file for complete search history.

(56) References Cited

U.S. PATENT DOCUMENTS

| | | | |
|---|---|---|---|
| 6,134,559 A | 10/2000 | Brumme et al. | 707/103 |
| 6,321,323 B1 * | 11/2001 | Nugroho et al. | 712/34 |
| 6,694,513 B1 | 2/2004 | Andersson et al. | 717/165 |
| 7,165,249 B2 | 1/2007 | Potter et al. | 717/174 |
| 7,174,370 B1 | 2/2007 | Saini et al. | 709/220 |
| 7,234,132 B2 | 6/2007 | Lam | 717/120 |
| 7,237,225 B2 | 6/2007 | Kompalli et al. | 717/108 |
| 8,006,236 B1 * | 8/2011 | Kilgard et al. | 717/136 |
| 2004/0210893 A1 * | 10/2004 | Chamberlain et al. | 717/168 |
| 2005/0096927 A1 | 5/2005 | Mehta et al. | 705/1 |
| 2005/0125463 A1 * | 6/2005 | Joshi et al. | 707/204 |
| 2005/0289532 A1 | 12/2005 | Zakon et al. | 717/165 |
| 2007/0067766 A1 * | 3/2007 | Tal et al. | 717/168 |
| 2007/0192364 A1 * | 8/2007 | Zhang | 707/104.1 |
| 2007/0221045 A1 * | 9/2007 | Terauchi et al. | 84/609 |
| 2007/0256058 A1 * | 11/2007 | Marfatia et al. | 717/137 |

OTHER PUBLICATIONS

Microsoft; "Planning and Architecture"; http://lnyswonger.members.winisp.net/BlogData/PDF/Planning_Architecture.pdf; 2006; pp. 1-1,056.
Microsoft; "Integration Patterns"; http://download.microsoft.com/download/a/c/f/acf079ca-670e-4942-8a53-e587a0959d75/IntPatt.pdf; 2004; 420 Pgs.
Microsoft; "Using Microsoft Technologies for Application Integration"; http://msdn2.microsoft.com/en-us/library/ms978648.aspx; 2007; 1 pg.

* cited by examiner

*Primary Examiner* — Wei Zhen
*Assistant Examiner* — Adam R Banes
(74) *Attorney, Agent, or Firm* — Merchant & Gould (57) ABSTRACT

Computer software applications may be separated into components and distilled into functional and identifying attributes, which may then be used to regenerate the computer software application on a different system. A component of a computer software program is received. From the component, one or more functional attributes describing the operation of the component on a first operating platform are distilled from which the component can be generated to operate on one or more operating platforms. Attributes identifying the component are identified. The functional attributes and the identifying attributes of the component are stored in a distillation store. From the distillation store, using information about a selected operating platform on which the computer software program is to be executed, components of the computer software program may be generated to execute on the selected operating platform.

19 Claims, 9 Drawing Sheets

APPLICATION DEHYDRATION, SYNCHRONIZATION, AND REHYDRATION

BACKGROUND

Considerable time and skill usually are involved in developing and maintaining computer software programs. The creation of a software programs for a single operating platform, whether a standalone client-based application, a host-based application, or a web-based application is a significant investment. Developing the application, however, is only part of the task. Over time, the need to make fixes, add features, and otherwise make updates is a substantial, ongoing task.

At least three issues further complicate these processes. First, when an application is updated or otherwise modified, deploying those updates may be a complicated task particularly when the application is deployed in large number of sites. One way to update the applications is to deliver an entire new application to replace the superseded version. Second, if an application administrator or user only wishes to update an application to secure changes to the application rather than the entire application, it requires careful organization of the updates to make sure that a user can procure only the desired updates. Third, all of these issues are complicated by the fact that it is often desirable to deliver applications that can execute on multiple operating platforms. For example, an application developed as a host-based program may prove desirable for standalone workstations or to be delivered as a web-based application. However, conventionally-developed computer software programs created for one operating platform generally will not execute on another operating platform.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Computer software applications may be separated into components and distilled into functional and identifying attributes, which may then be used to regenerate the computer software application on a different system. From a component of a computer software program one or more functional attributes describing the operation of the component on a first operating platform are distilled from which the component can be generated to operate on one or more operating platforms. Attributes identifying the component are identified. The functional attributes and the identifying attributes of the component are stored in a distillation store. From the distillation store, using information about a selected operating platform on which the computer software program is to be executed, components of the computer software program may be generated to execute on the selected operating platform.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

DETAILED DESCRIPTION OF IMPLEMENTATIONS

This detailed description describes implementations of distilling and generating components of computer software programs. Implementations of the present disclosure use a distillation store maintains a plurality of component entries, each of which includes a series of attributes about a component of the computer software program. The components may include modules of the computer software program, queries, tables, and any other component of the computer software program. The component entries included in the distillation store may include both identifying attributes and functional attributes of a component.

The identifying attributes include information such as a program name, version number, update date, and other information that describe the nature of the component to allow the identification and retrieval of needed or desired components from the distillation store. The functional attributes include, in a non-executable form, a complete description of the functional attributes of the component. Using the functional attributes and known information about a selected operating platform on which the component is to be made executable, the component is automatically generated for deployment on the selected operating platform.

Using implementations of the present disclosure, a computer software program may be created and for one or more selected operating platforms without having to separately code the application for each selected platform. Instead, each of the components is described in the distillation store only a single time in them that component can be generated for multiple platforms automatically.

In addition, the functional and/or identifying attributes of each of the components can be extracted and/were identified from components developed for a current operating platform to distill the identifying and functional attributes of those components. Thus, components of an existing application for current operating platform can be distilled and generated for other operating platforms. The components of the application also can be regenerated for the current operating platform so that the distillation store also serves as a store and/or backup for the computer software program originally created for the current platform.

Furthermore, with the components being separately stored in component entries in the distillation store described by the identifying attributes also included in the component entries, the process of updating a software program is simplified. When new or updated components are desired, thus new or updated components can be recognized selected using the identifying attributes. Then just those desired components can be generated and deployed to update the computer software program without having to deploy and/or install entire new versions or any components that already are current.

The process of extracting and collecting attributes from components of a computer software program can be regarded as dehydrating the computer software program and its components, rendering the components into a storable form from which they can be regenerated as desired. Correspondingly, the regeneration of these components can be regarded as taking the stored form of the components and rehydrating them for use. Taking advantage of the identifying attributes of the components, updated or otherwise modified components can be selectively retrieved and regenerated to update the components to synchronize a deployed computer software program with its most current version.

Illustrative Operating Environments

Implementations of the present disclosure may be supported by a variety of computing devices. According to implementations of the present disclosure, the client computing devices may communicate with a server system or a host system over a network. Both the client computing systems and the server system may include variations of a general purpose computing system that support implementations of the present disclosure.

Figure 1:
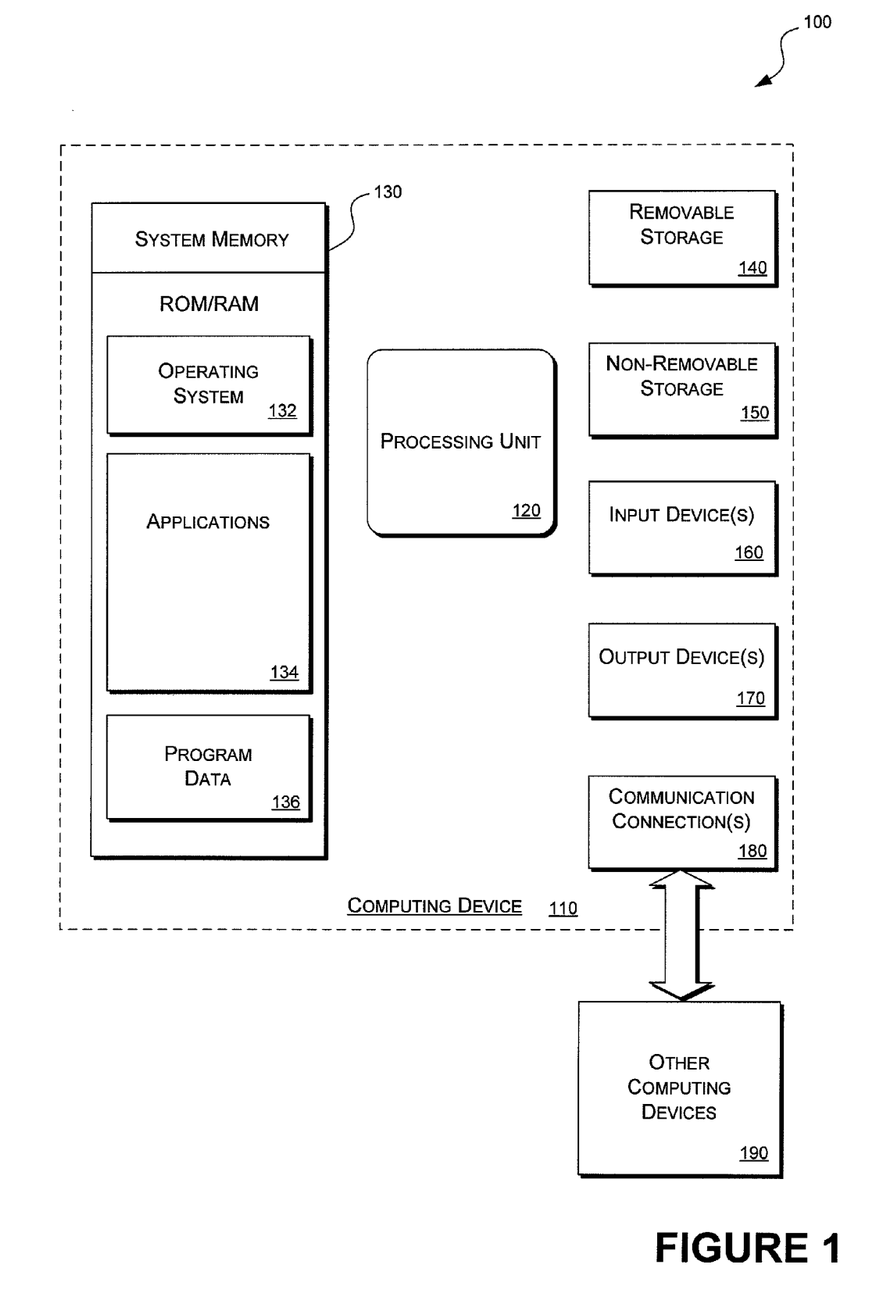
FIG. 1 is a block diagram of an operating environment supporting computer-implemented methods and computer-readable media implementations of the present disclosure.

FIG. 1 is a block diagram of a representative operating environment 100 operable to support computer-implemented methods and computer-readable media as herein described. The operating environment is representative of both a client computing system operable to run a client listener program and the server system on which the code is executed, as well as to communicate with each other over a network.

Referring to FIG. 1, an exemplary operating environment 100 includes a computing device 110. In a basic configuration, the computing device 110 may include any of a number of forms of stationary or mobile computing devices. The computing device 110 typically includes at least one processing unit 120 and a system memory 130. Depending on the exact configuration and type of computing device, the system memory 130 may be volatile (such as RAM), non-volatile (such as ROM, flash memory, and the like) or some combination of the two. The system memory 130 typically maintains an operating system 132, one or more applications 134, and program data 136.

The computing device 110 may also have additional features or functionality. For example, the computing device 110 may also include additional data storage devices (removable and/or non-removable) such as, for example, magnetic disks, optical disks, nonvolatile memory storage, and other types of storage devices. Such additional storage is illustrated in FIG. 1 by removable storage 140 and non-removable storage 150. Computer storage media may include volatile and non-volatile, removable and non-removable media implemented in any method or technology for storage of information, such as computer readable instructions, data structures, program modules or other data. The system memory 130, the removable storage 140, and the non-removable storage 150 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 110. Any such computer storage media may be part of the computing device 110. The computing device 110 may also have input device(s) 160 such as a keyboard, mouse, pen, voice input device, touch input device, etc. Output device(s) 170 such as a display, speakers, printer, etc., may also be included.

The computing device 110 also may include one or more communication connections 180 that allow the computing device 110 to communicate with other computing devices 190, such as over a network or a wireless network. The one or more communication connections 180 are an example of communication media. Available forms of communication media typically carry computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Figure 2:
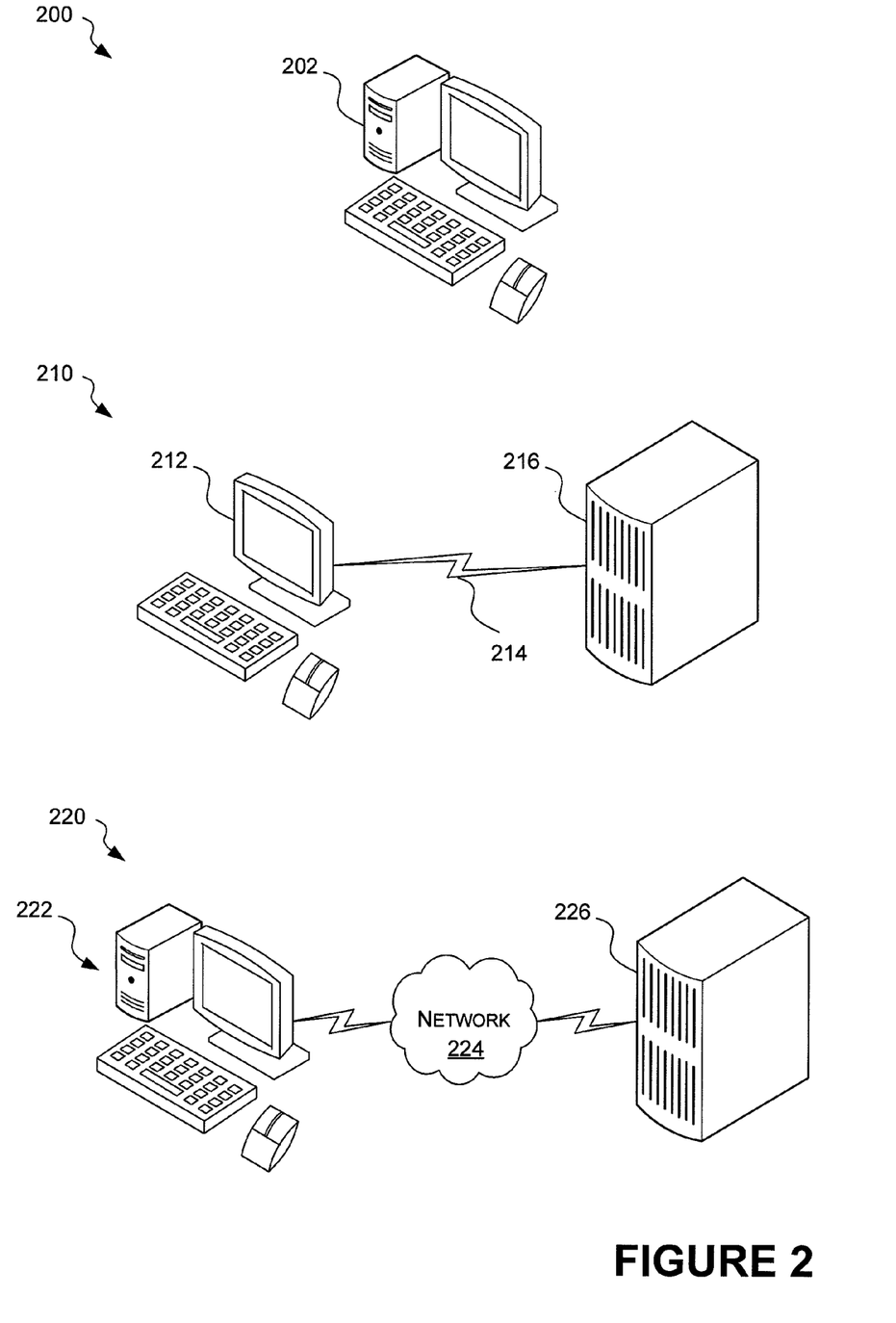
FIG. 2 is a block diagram of environments in which a computer software program may be deployed and updated according to implementations of the present disclosure.

FIG. 2 illustrates a plurality of computing environments in which implementations of the present disclosure may be used. In a standalone, workstation environment 200, a computer software program executes locally on a computing system 202. Although not shown in FIG. 2, it is assumed that the computing system 202 has at least occasional access to a network (not shown) to seek and/or receive software updates from a server accessible over the network.

In a server-based or host-based environment 210, a terminal or a computing device configured to act as a terminal to a host system 216 communicates over a network or other communication medium 214 with a host or server 216. The computer software program executes on the host or server 216, using the hardware and software resources of the host or server and interacting with the user over the terminal 212 in communication medium 214.

In a networked-based for web-based environment 220, a personal computer or workstation 222 communicates over a network 224, such as the Internet using the World Wide Web, with a server 226. As in many web-based applications, server 226 handles data manipulation and access/storage operations while the workstation 222 is relied upon to generate and manage user interfaces.

In each of the computing environments 200, 210, and 220, components of the computer software programs executing in these environments may be coded to execute on different hardware platforms were under different operating systems. For example, in the workstation environment 200, the computer software program may be created to operate in a Microsoft Windows® or Microsoft Vista® environment using one of these operating systems produced by Microsoft Corporation of Redmond, Wash. On the other hand, and the host-based environment 210, the computer software program executing on the host 216 may operate in a UNIX environment. A computer software program created for one of these environments will not execute without rewriting or substantial modification and another operating environment. Moreover, as the computer software programs for these different operating platforms are modified, fixed, or updated, changes to the different computer software programs will have to be developed, maintain, and delivered for each of the separate operating platforms. Implementations of the present disclosure, has further described below seek to resolve the disparities between the different operating platforms to simplify the proliferation and maintenance of computer software programs.

"Dehydration" and "Rehydration" of Computer Software Program Components

Implementations of the present disclosure separate computer software programs into their constituent components and then distill the components into identifying attributes describing the components and functional attributes that define the operation of the components. The components, which may be separately added, deleted, updated, or otherwise changed, also can be retrieved or transmitted separately to deploy these components in different operating platforms or to update existing deployments.

As previously described, the process of extracting and collecting attributes from components of a computer software program can be regarded as dehydrating the computer software program and its components, rendering the components into a storable form from which they can be regenerated as desired. Correspondingly, the regeneration of these components can be regarded as taking the stored form of the components and rehydrating them for use. Taking advantage of the identifying attributes of the components, updated or otherwise modified components can be selectively retrieved and regenerated to update the components to synchronize a deployed computer software program with its most current version.

Figure 3:
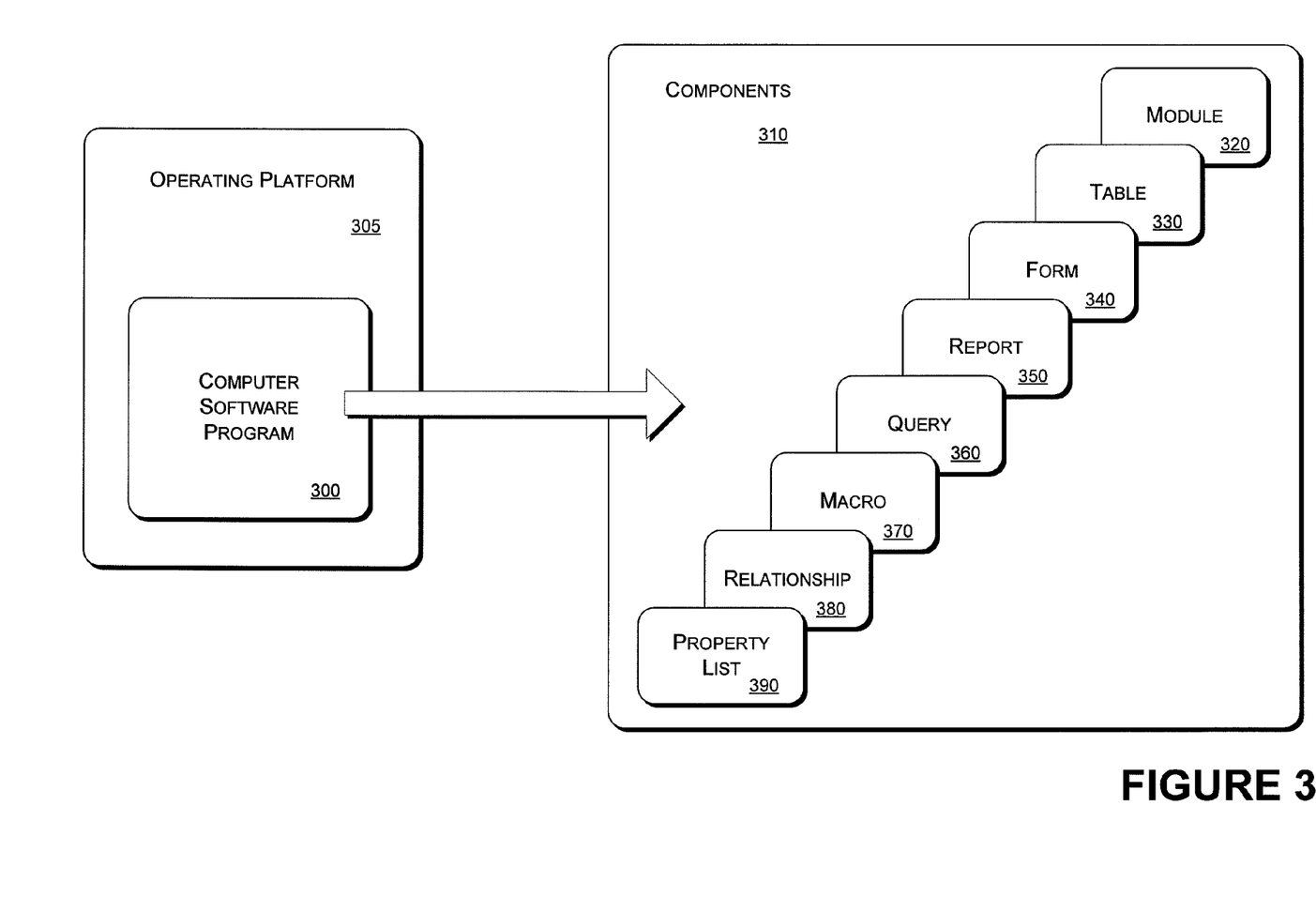
FIGS. 3-6 are block diagrams of distillation and/or generation of components of computer software programs according to implementations of the present disclosure.

FIG. 3 shows a computer software program 300 executing on an operating platform 305. The computer software program 300 may be broken down into or regarded as a plurality of components 310. For example, the components 310 may include one or more software modules 320 that include the operating code of the computer software program 300. The components 310 also may include one or more tables 330 used for the manipulation and/or storage of system data and user data. The components may include one or more forms 340 that solicit information from users as well as one or more reports 350 to present information to users. The components 310 may include one or more queries associated with user or system operations that are used to access and retrieve information from data stores. The components 310 also may include one or more macros to simplify interaction with the computer software program 300, as well as one or more relationships 380 and/or property lists 390. Any other components used in the operation of the computer software program also may can be considered as components 310 of the computer software program 300 and managed as the other components 310 or according to implementations of the present disclosure.

Figure 4:
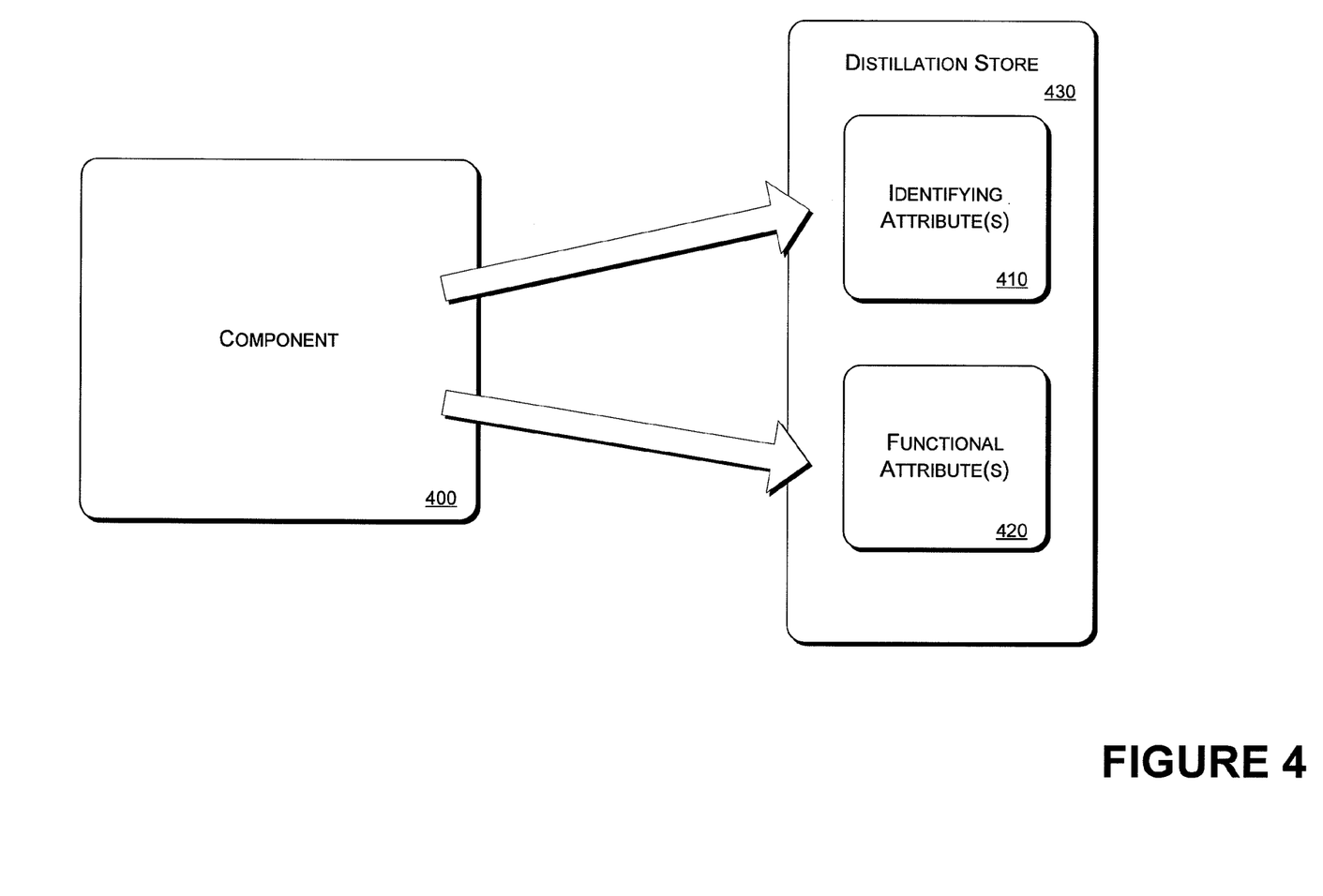

FIG. 4 shows an exemplary component 400 that, according to implementations of the present disclosure, is distilled into attributes to identify and define the operation of the component 400. Specifically, the component 400, which may include a software module, may be associated with a number of identifying attributes 410. These identifying attributes 410, which may be embedded in the component 400, included in the metadata associated with the component 400, or otherwise affiliated with the component 400, may include a name or designation of the component, a version number of the component 400 or the computer software program which is part, an update date, or other information. The identifying attributes 410 thus described what the component is and provide some indication of when it was created or changed to allow for identification and retrieval of components updated after a selected date.

The component 400 also may be defined by its functional attributes 420. For example, in the case of a software module, the module can be defined by the data, variables, and operands it uses, the operations the module performs on such inputs, and the outputs it generates. The functional attributes may specify what other components the module uses, such as what tables, reports, queries, and other components it uses. The functional attributes 420 can be defined by a developer or derived from an existing computer software program as described below.

The identifying attributes 410 and the functional attributes 420 are collected and stored in a distillation store 430. The distillation store 430 thereby provides a repository defining and describing the components used by one or more applications. From the distillation store 430, the components of the computer software program can be generated for one or more operating platforms.

Figure 5:
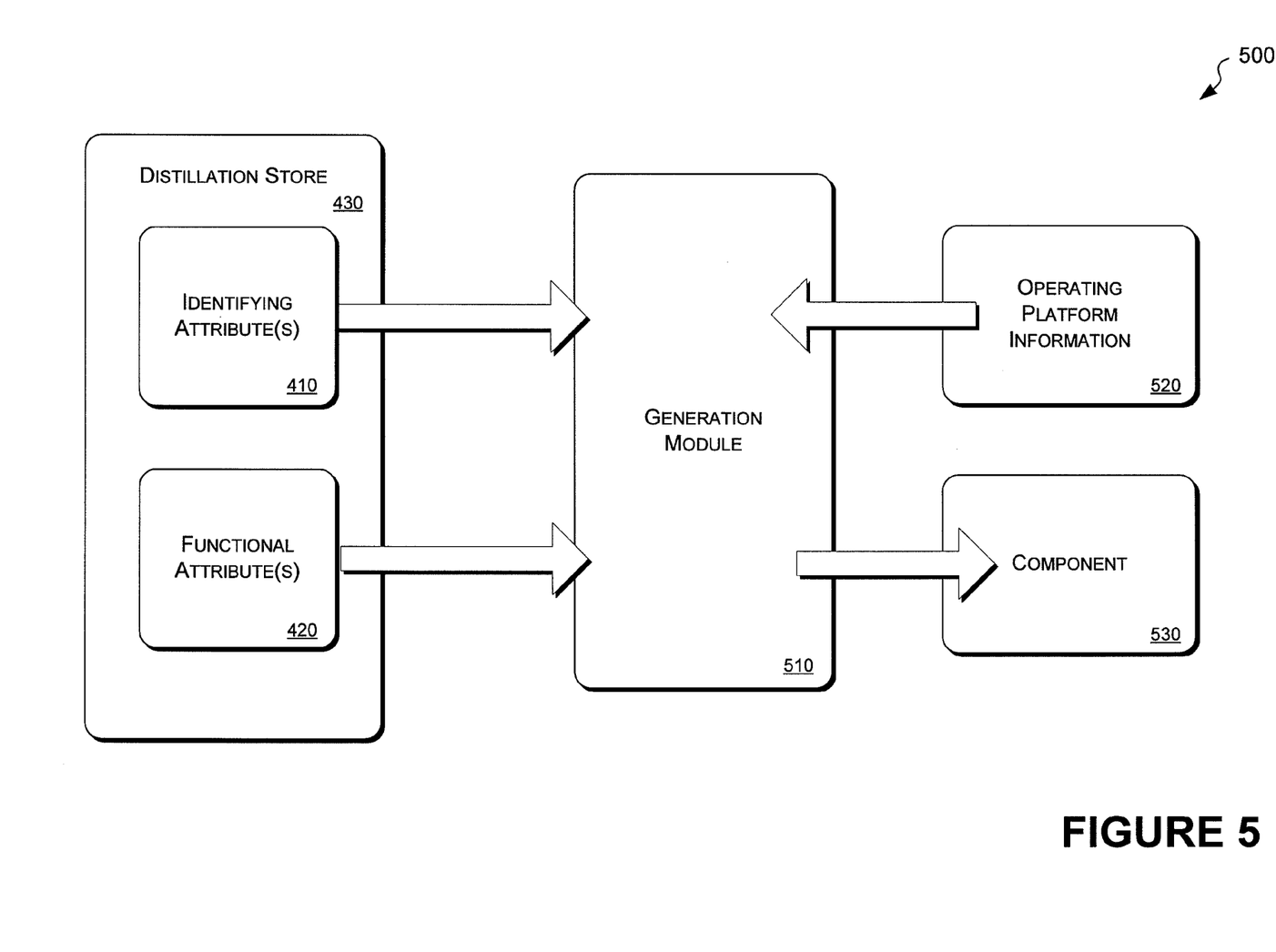

FIG. 5 illustrates a system 500 in which components are generated for a selected operating platform according to implementations of the present disclosure. The contents of the distillation store 430, including both the identifying attributes 410 and the functional attributes 420 for one or more components are made available to a generation module 510. The generation module 510 accesses operating platform information 520 for one or more operating platforms including, at least, a selected operating platform for which an executable component 530 is to be generated.

The generation module 510 identifies one or more components to be generated according to the identifying attributes 410. For example, if an administrator or a user wishes to update an application and apply all updates included in a designated version or created on or after a specified date, all of the components represented in the distillation store 430 meeting those criteria are accessed by the generation module 510. Alternatively, the generation module 510 is being used to generate a full computer software program including all of its components, the generation module 510 will access all of the components in the distillation store 430 for that computer software program.

Once the one or more components to be generated have been identified using the identifying attributes 410, the generation module 510 receives the functional attributes 420 for each of the components. Using the functional attributes 420 that define the operation of the component, the generation module 510 uses the operating platform information 520 for the selected operating platform to generate the component 530. In addition, the identifying attributes 410 for the respective component 530 it may be embedded in or otherwise associated with the component as metadata or another form to support subsequent access to the component 530.

According to implementations the present disclosure, using the functional attributes 420, the component 530 can be generated for in a selected operating platform for which there is operating platform information 520 to translate the descriptions included in the functional attributes 420 to an executable component 530. Thus, for example, if the component is a program module and the functional attributes 420 for the module describe performing a mathematical operation on two specified variables of a stated type, the generation module 510 uses information about the selected operating platform from the operating platform information 520 to generate the executable code. For example, the operating platform information 520 will be accessed to retrieve appropriate syntax for the declaration or identification of the variables of the indicated type in the syntax for defining the mathematical operation to be performed on the variables. The functional attributes 420 and the operating platform information 520 also will be consulted to get information as to how designate the result of the operation as output from the module so that the output can be used with computer software program. With the functional attributes 420 thus translated into an executable form, but generation module 510 generates the executable component 530 for the selected operating platform.

Figure 6:
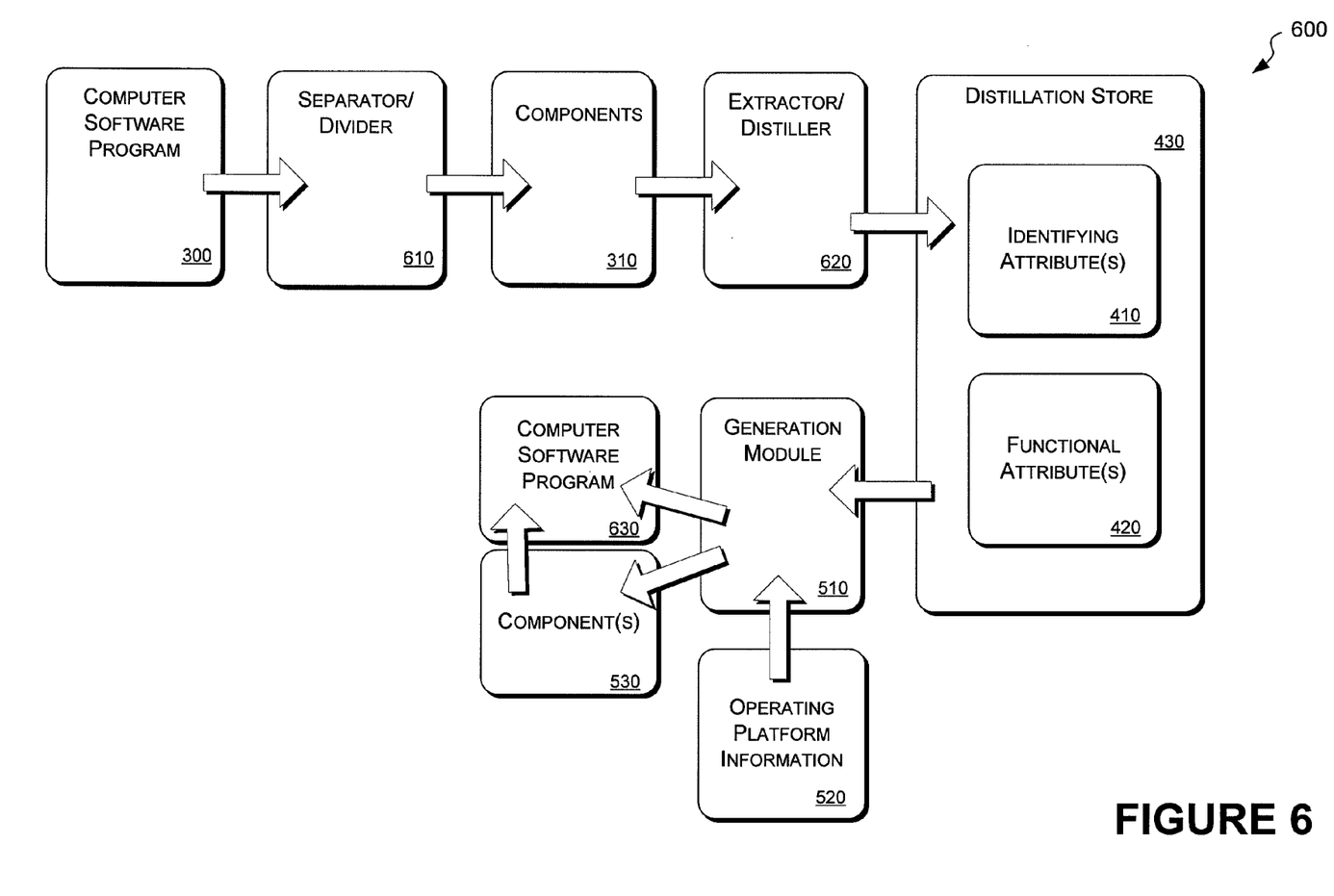

FIG. 6 illustrates a complete system 600 for the distillation and/or generation of components of computer software program. Persons ordinarily skilled in the art of computer software will recognize that the system 600 may be implemented in a hardware system or in a software system, such as in the form of computer-implemented methods or and computer-readable media storing instructions executable by computing system to perform functions of the system 600.

According to implementations of the present disclosure, an existing computer software program 300 to be distilled into its separate components is received by a separator/divider 610. The separator/divider 610 is configured to particulate the computer software program 320 into its individual components 310. For example, as previously described, the components 310 may include program modules, reports, forms, and other components of the computer software program 300. The resulting components 310 are then received by an extractor/distiller 620. The extractor/distiller 620 analyzes the content of the received components 310 and, from the components 310, collects identifying attributes 410 describing the components 310 and the functional attributes 420 defining the components 310. Again, as previously described, if the component is a module, the identifying attributes 410 may include the variables and other data used, the operations performed on the data, and the outputs.

According to implementations of the present disclosure, separator/dividers 610 and/or different extractor/distillers 620 may be created for each of the operating platforms from which computer software programs 300 are to be processed. Alternatively, all purpose separator/dividers 610 and extractor/distillers 620 may be used that have access to operating platform information (not shown in FIG. 6) that can be used in processing the computer software programs 300. Once the identifying attributes 410 and functional attributes 420 have been extracted, they are stored in a distillation store from which information about the components 310 can be accessed as previously described with reference to FIG. 5.

From the identifying attributes 410 and the function attributes 420 maintained in the distillation store 430 and operating platform information 520 providing information about the selected operating platform for which components are to be generated, the generation module 510 generates desired components 530 (which may then be assembled into a computer software program (i.e. program 630) and/or an entire computer software program 630. The components 530 or the computer software program 630 generated may be generated for the same operating platform as the original computer software program 300. The distillation store 430 thus acts as a source for installation of the computer software program 630 and/or a source for updates of the computer program. Alternatively, the components 530 and/or the computer software program 630 can be generated for execution on a different operating platform, allowing the original computer software program 300 to be automatically regenerated for a different operating platform without extensive modification or recoding.

Structure of a Distillation Store

According to implementations of the present disclosure, the distillation store takes the form of a table that includes entries for each of the represented components. Within each of the entries, the attributes describing and defining the components are stored.

Figure 7:
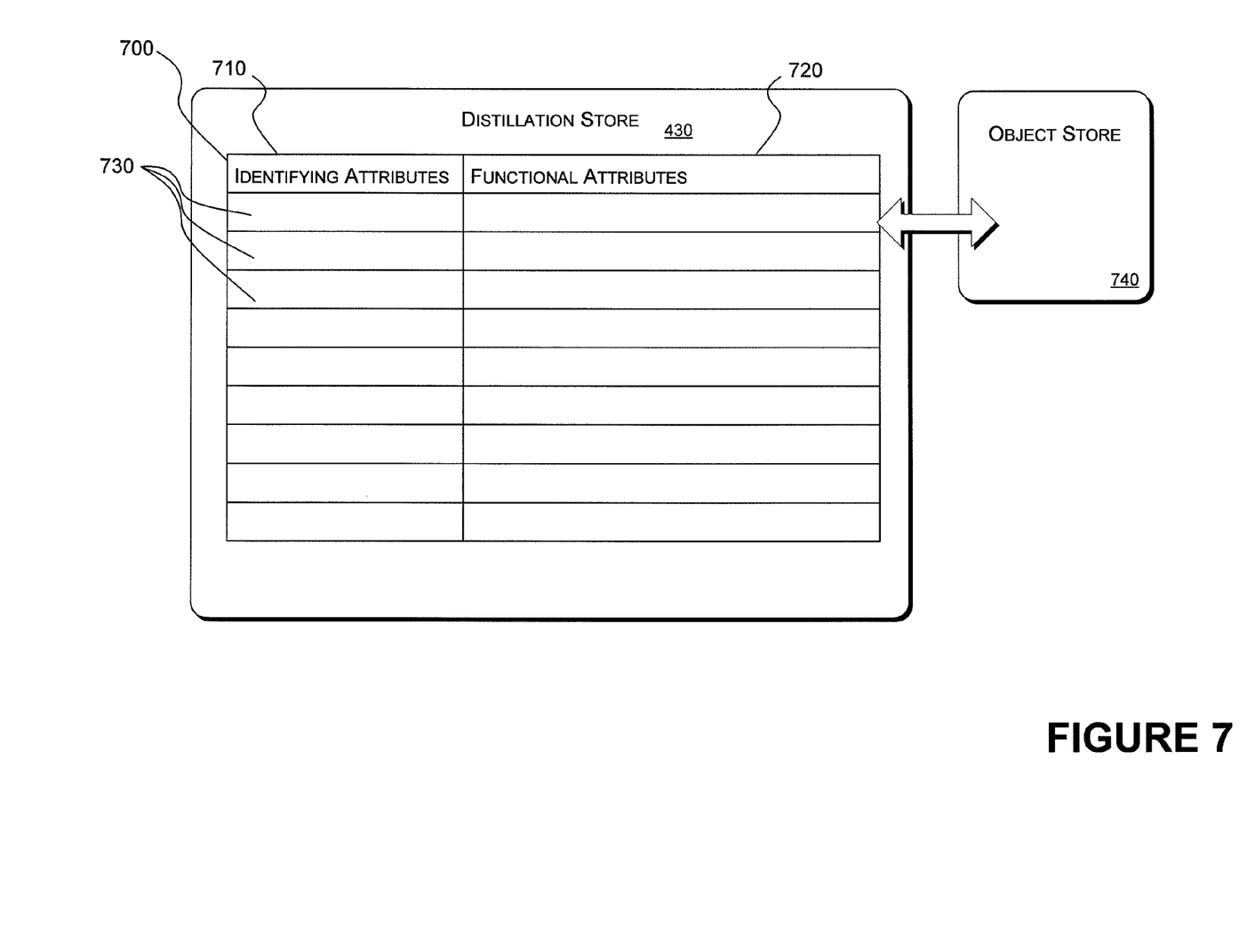
FIG. 7 is a block diagram of a component table and an associated object store for storing component entries according to implementations of the present disclosure.

FIG. 7 shows a distillation store 430 in the form of a component table 700. The component table is depicted as having two columns, a first column for storing identifying attributes 710 and a second column for storing identifying attributes 720, for each of a plurality of component entries 730 representing each of the components represented in the distillation store 430. Thus, according to an implementation of the present disclosure, attributes of each component represented in the distillation store are stored in a row or component entry 730 of the table 700. Specifically, all the identifying attributes, such as program name, component name, version number, update data, and other identifying information are collected in the identifying attributes column 710. The functional attributes defining the operation of the component are listed in the functional attributes column 720 of that same row or component entry.

To access the distillation store, component entries representing desired or needed components can be identified by searching the identifying attributes column 710, for example, to find all the component entries 730 for a specified version of a specified application that have been updated since a specified date. Upon identifying one or more desired or needed component entries 730, the content stored in the corresponding functional attributes column 720 are retrieved and submitted to a generation module to generate the desired or needed components.

It should be noted that each of the columns 710 and 720 may include multiple entries for each of the component entries to store all of the identifying and functional attributes of each of the components represented or the columns 710 and/or 720 may each include a plurality of sub-columns. Similarly, more than one component entry 730 may be used to represent a component, more than one component may be combined and represented in a single component entry 730, and/or component entries 730 may be subdivided into a plurality of sub-rows. The order of the identifying attributes 710 column and the functional attributes column 720 certainly could be reversed.

It also should be noted that the table 700 may include more than two dimensions. For example, attributes within each of the columns 710 and 720 may be listed in a third dimension of the table. Also, the component entries 730 could be the columns of the table 700 with the attributes presented in rows. Furthermore, although implementations of the present disclosure use a table structure for the distillation store 430, other data structures, such as lists, multidimensional data cubes and other structures also may serve as distillation stores 430 for implementations of the presentation disclosure.

FIG. 7 also illustrates an object store 740 associated with the table 700 of the distillation store 430. An object store 740 may include components or portions of components that are undesirable, impractical, or impossible to distill into functional attributes. Alternatively, if the object is platform independent such that it can be used by different operating platforms, it may be unnecessary or undesirable to expend resources distilling the component into an attribute-based representation.

For example, a form or a report of a computer software program may include a graphic or other media file. It may be impractical or impossible to distill or dehydrate, for example, a graphic of a logo into functional attributes. Thus, instead of attempting to translate the graphic into its functional attributes, the graphic is stored in the object store. If the graphic or other object is or is treated as its own component, the table 700 will include information in the identifying attributes column 710 describing the object and the functional attributes column 720 will include a pointer, an address, or some other reference identifying how to retrieve the object from the object store 740. Alternatively, if the object is a portion of another component, within attributes listed in the functional attribute column 720 the reference identifying how to retrieve the object and information about the function or use of the object will be included in the component entry 730 for that component.

Figure 8:
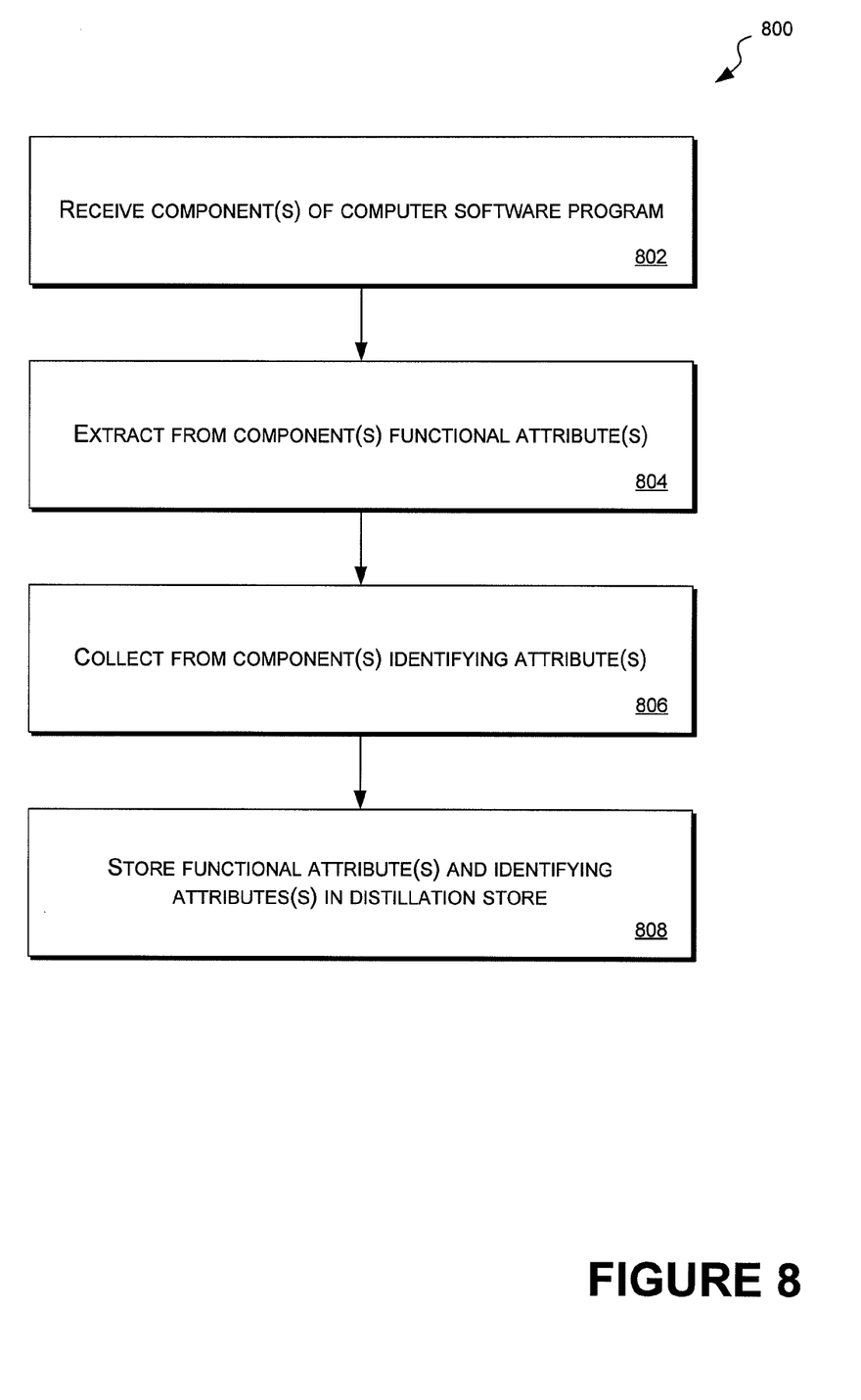
FIGS. 8 and 9 are flow diagrams of representative processes for distilling and generating components of a computer software program according to implementations of the present disclosure.

Processes for Dehydrating and Rehydrating Components of a Computer Software Program FIG. 8 is a flow diagram 800 of a process for distilling or dehydrating one or more components of a computer software program according to an implementation of the present disclosure.

At 802, one or more components of the computer software program are received. As described with reference to FIG. 6, the components may be received from a separator/divider that divides a computer software program into separate components. Alternatively, the computer software program itself may be manifested as a series of separate components limiting themselves to being received by a distiller/extractor 620 for processing.

At 804, the one or more functional attributes defining the functional aspects of the one or more components are extracted. With reference to FIG. 7, if the component or a portion of the component is not appropriate for distillation, that object may be stored in an object store 740 and referenced by an element within the component entry. At 806, identifying attributes describing each of the one or more components are collected. At 808, the one or more identifying attributes and one or more functional attributes of the components are stored in the distillation store.

Components can be processed one at a time, extracting the functional attributes and the identifying attributes from each of the components. Alternatively, particularly when a plurality of components all have some common identifying attributes, such as a program name and version number, the identifying attributes for each of the components may be collected in one operation and in the functional attributes from the components may be collected in one or more separate operations.

Figure 9:
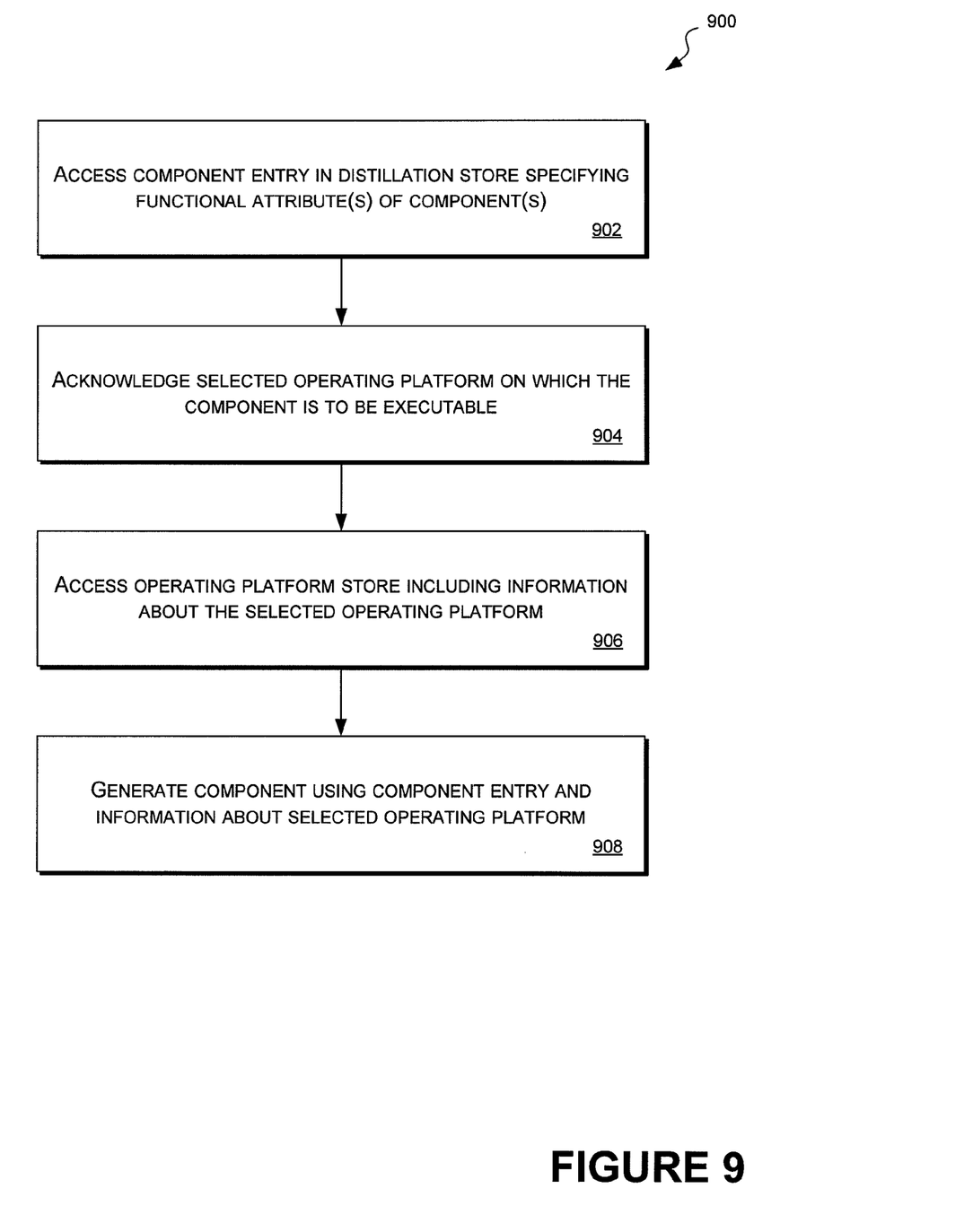

FIG. 9 is a flow diagram 900 of a process for rehydrating one or more components of a computer software program according to implementations of the present disclosure.

At 902, a component entry for a selected component (or the component entries for a number of selected components) is accessed from the distillation store. As previously described, components may be selected using identifying attributes also included in the distillation store. Alternatively, if an entire computer software program is being regenerated, all of the component entries in a particular distillation store or section of the distillation store may be accessed to generate the computer software program.

At 904, the selected operating platform for which the component is to be made executable is acknowledged. If the generation module is tailored to generate or regenerate components for a single operating platform, it will be appreciated that acknowledgment of the selected operating platform is inherent for the generation module. On the other hand, if the generation modules capable of generating components for more than one operating platform acknowledgment of the selected operating platform may include recognizing an appropriate store of information about the selected operating platform to facilitate component generation.

At 906, an operating platform information store providing information about the selected operating platform is accessed. As described in the last paragraph, if the generation module is configured to generate components for a particular operating platform, the operating platform information needed may be included in or joined with the generation module. On the other hand, if the generation module can generate components from more than one operating platform, the appropriate store of operating platform information acknowledged at 904 is accessed to facilitate component generation.

At 908, using the component entry information and information about the selected operating platform, the component is generated. The component entry information used will include the functional attributes of the component. The component entry information used also may include one or more of the identifying attributes included in the component entry to be associated with or embedded in the component to allow the component to be identified. For example, if the generated components were later used as a basis for distilling components of the application, the associated or embedded identifying attributes would be collected from the component to facilitate the distillation or dehydration process. Also, with reference to FIG. 7, a component represented by an object or including an object maintained in an object store 740 also will be used to generate the component.

The above specification, examples and data provide a complete description of the manufacture and use of the composition of the invention. Because many embodiments of the invention can be made without departing from the spirit and scope of the invention, the invention resides in the claims hereinafter appended.

We claim:

1. A computer-readable storage medium that is not a signal storing instructions executable by a computing system, comprising:
   an application separator module configured to:
      receive the application;
      separate the application into components comprising software modules; a table; a form; a report; and a query; and
      making the components available to a distiller module;
   for each component of the application, the distiller module configured to:
   extract functional attributes from the component of an application configured to operate on a first operating platform, the functional attributes including information from which the component can be generated to operate on one or more operating platforms; and
   collect identifying attributes of the component including one of more of:
   an application identifier specifying the application with which the component is associated;
   a version identifier of one of the component and the application with which the component is associated;
   an update identifier indicating a most recent update of the component; and
   a description of the component;
   a distillation storage module configured to:
   receive the functional attributes and the identifying attributes of the component;
   store the functional attributes and the identifying attributes from the component in a component entry a single time; and provide access to the component entry; and
a component generator module configured to:
access the distillation store to determine the component entry to retrieve based on a search of the distillation store and retrieve the component entry based on criteria of the search;
acknowledge a selected operating platform; and
generate the component for the selected operating platform from the functional attributes of the component entry.

2. The computer-readable storage medium of claim 1, wherein the components further comprise one of: a module; a table; a form; a report; a query; a macro; a relationship; and a property list.

3. The computer-readable storage medium of claim 1, wherein the first operating platform and the selected operating platform each includes one of: a client platform; a server platform; and a web platform, wherein the first operating platform and the selecting operating platform include one of the same platform and different platforms.

4. The computer-readable storage medium of claim 1, wherein the distillation storage module includes a component table, wherein the component table includes:
a first dimension configured to accommodate a plurality of component entries; and
a second dimension configured to accommodate a plurality of entries for the functional attributes and the identifying attributes of each of the corresponding component entries.

5. The computer-readable storage medium of claim 4, further comprising an object storage module configured to store one or more non-distilled components, wherein:
for each of the non-distilled components the functional attributes in the component entry include a reference to a location in an object store where the non-distilled object is stored; and
in generating the non-distilled component, the component generator retrieves the non-distilled object from the object store.

6. A computer-implemented method, comprising:
receiving a component of a computer software program that was separated into different software components comprising: software modules; a table; a form; a report; and a query;
extracting from the component one or more functional attributes of the component describing the operation of the component on a first operating platform from which the component can be generated to operate on one or more operating platforms;
collecting identifying attributes of the component, and
storing the functional attributes and the identifying attributes of the component in a distillation store that is later accessed to search for a portion of the components stored in the distillation store for generation to the one or more operating platforms.

7. The computer-implemented method of claim 6, further comprising:
receiving the computer software program; and
making each of the components available for the one or more functional attributes to be extracted from the component.

8. The computer-implemented method of claim 6, wherein the components further comprise a macro; a relationship; and a property list.

9. The computer-implemented method of claim 6, wherein the identifying attributes includes one or more of:
an application identifier specifying the application with which the component is associated;
a version identifier of one of the component and the application with which the component is associated;
an update identifier indicating a most recent update of the component; and
a description of the component.

10. The computer-implemented method of claim 6, wherein the distillation store is configured for:
receiving the functional attributes and the identifying attributes of the component;
storing the functional attributes and the identifying attributes from the component in a component entry; and
provide access to the component entry from which the functional attributes and the identifying attributes can be accessed.

11. The computer-implemented method of claim 6, wherein the distillation store includes a component table, wherein the table includes:
a first dimension configured to accommodate a plurality of component entries; and
a second dimension configured to accommodate a plurality of entries for the functional attributes and the identifying attributes of each of the corresponding component entries.

12. The computer-implemented method of claim 6, further comprising an object store configured to store one or more non-distilled components, wherein for each of the non-distilled components the functional attributes in the component entry include a reference to a location in the object store where the non-distilled object is stored.

13. The computer-implemented method of claim 6, first operating platform and the one or more operating platforms each includes one of: a client platform; a server platform; and a web platform, wherein the first operating platform and the selecting operating platform include one of the same platform and different platforms.

14. A computer-implemented method, comprising:
accessing a distillation store including component entries in a non-executable form specifying one or more functional attributes of the component of a computer software program describing the operation of the component, wherein the computer software program was separated into different software components comprising: software modules; a table; a form; a report and a query;
acknowledging a selected operating platform on which the component of the computer software program is to be executable;
accessing an operating platform store including information about the selected operating platform; and
searching the distillation store based on the component entry and the information about the selected operating platform to determine the component to retrieve and generating the component for execution on the selected operating platform.

15. The computer-implemented method of claim 14, further comprising selecting the at least one component from the distillation store according to one or more identifying attributes associated in the distillation store with the at least one component.

16. The computer-implemented method of claim 14, wherein the components further comprise macro; a relationship; and a property list.

17. The computer-implemented method of claim 14, wherein the selected operating platform includes one of: a client platform; a server platform; and a web platform.

18. The computer-implemented method of claim 14, wherein the distillation store module includes a component table, wherein the component table includes:
   a first dimension configured to accommodate a plurality of component entries; and
   a second dimension configured to accommodate a plurality of entries for the functional attributes and the identifying attributes of each of the corresponding component entries.

19. The computer-implemented method of claim 14, further comprising an object store configured to store one or more non-distilled components, wherein:
   for each of the non-distilled components the functional attributes in the component entry include a reference to a location in an object store where the non-distilled object is stored; and
   in generating the non-distilled component, the component generator retrieves the non-distilled object from the object store.

* * * * *